(12) United States Patent
Obikane et al.

(10) Patent No.: US 6,243,417 B1
(45) Date of Patent: Jun. 5, 2001

(54) DEVICE AND METHOD FOR ENCODING IMAGE DATA, AND IMAGE DATA TRANSMISSION METHOD

(75) Inventors: Nobuhisa Obikane; Kanji Mihara; Takuya Kitamura, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/117,940

(22) PCT Filed: Dec. 12, 1997

(86) PCT No.: PCT/JP97/04595
§ 371 Date: Nov. 2, 1998
§ 102(e) Date: Nov. 2, 1998

(87) PCT Pub. No.: WO98/26599
PCT Pub. Date: Jun. 18, 1998

(30) Foreign Application Priority Data

Dec. 12, 1996 (JP) .................................................. 8-332082
Jun. 30, 1997 (JP) .................................................. 9-174791

(51) Int. Cl.[7] .................................................. H04B 1/66
(52) U.S. Cl. .............................. 375/240.03; 375/240.12
(58) Field of Search .................................. 348/388, 397, 348/405, 409, 419, 425, 394, 390.1, 396.1, 388.1, 397.1, 409.1, 419.1, 423.2, 394.1; 382/239; 386/109; 398/384; 375/240.02, 240.03, 240.12; 370/468

(56) References Cited

U.S. PATENT DOCUMENTS

| | | | |
|---|---|---|---|
| 5,115,309 | * 5/1992 | Hang | 348/388.1 |
| 5,159,447 | * 10/1992 | Haskell et al. | 348/419 |
| 5,231,484 | * 7/1993 | Gonzales et al. | 348/405 |
| 5,491,513 | * 2/1996 | Wickstrom et al. | 348/409 |
| 5,606,369 | * 2/1997 | Keesman et al. | 348/385 |
| 5,719,986 | * 2/1998 | Kato et al. | 386/109 |
| 5,793,425 | * 8/1998 | Balakrishnan | 348/387 |
| 5,802,213 | * 9/1998 | Gardos | 348/405 |
| 5,883,672 | * 3/1999 | Suzuki et al. | 348/405 |
| 6,151,360 | * 11/2000 | Kato et al. | 375/240.03 |

FOREIGN PATENT DOCUMENTS

| | | |
|---|---|---|
| 4-257185 | 9/1992 | (JP) . |
| 4-329089 | 11/1992 | (JP) . |
| 5-41860 | 2/1993 | (JP) . |
| 6-197329 | 7/1994 | (JP) . |
| 6-253277 | 9/1994 | (JP) . |
| 6-284401 | 10/1994 | (JP) . |
| 7-264580 | 10/1995 | (JP) . |
| 7-284096 | 10/1995 | (JP) . |
| 7-312754 | 11/1995 | (JP) . |
| 7-322254 | 12/1995 | (JP) . |
| 8-18952 | 1/1996 | (JP) . |
| 8-18960 | 1/1996 | (JP) . |

* cited by examiner

Primary Examiner—Chris Kelley
Assistant Examiner—Gims Philippe
(74) Attorney, Agent, or Firm—Frommer Lawrence & Haug, LLP; William S. Frommer; Darren M. Simon

(57) ABSTRACT

Plural n number of encoders $2_1, 2_2 \ldots 2_n$ carry out reading in advance of parameter information PAR. #1, #2 ... #n with respect to respective n number of programs prog. 1, 2 ... n to allow a controller 3 to estimate encoding difficulty related information "difficulty" when picture is encoded, and to compression-encode the plural n number of programs on the basis of target encoding rate that the controller 3 has calculated on the basis of the parameter information. The controller 3 calculates allocation code quantities target_rate #1, #2 ... #n every respective programs from the parameter information PAR. #1, #2 ... #n. A multiplexer 4 multiplexes streams "stream" #1, #2 ... #n that the encoders $2_1, 2_2 \ldots 2_n$ have encoded in correspondence with the allocation code quantities targer_rate #1, #2 ... #n.

18 Claims, 11 Drawing Sheets

DEVICE AND METHOD FOR ENCODING IMAGE DATA, AND IMAGE DATA TRANSMISSION METHOD

TECHNICAL FIELD

This invention relates to a video data encoding apparatus and a video data encoding method adapted for encoding, so as to multiplex plural, e.g., n (n≧2) number of video programs to allow the transmission rate to be a predetermined value or less, the plural n number of video programs, and a video data transmission method adapted for allocating different target encoding rates to plural n(n≧2) number of video programs in order to allow the transmission rate to be set to a predetermined value or less to encode such video programs thereafter to multiplex them to carry out transmission thereof.

BACKGROUND ART

In recent years, for compression-encoding of video data, there have been widely used MPEG (Moving Picture Experts Group) or MPEG 2 in which MC (Motion Compensation) processing and redundancy reduction processing by orthogonal transform such as DCT (Discrete Cosine Transform), etc. are combined. Particularly, the video compression encoding technology of MPEG 2and function of the communication satellite have been combined to thereby realize the digital broadcast of image. Further, in future, digital broadcasting of image using ground wave is being realized.

The merit of the digital broadcasting is that a larger number of programs are permitted to undergo transmission in the same transmission path as compared to the analog broadcasting. This results from the fact that image can be compression-encoded.

As a method of carrying out a larger number of programs, the technique called "statistical multiplexing" is proposed. The statistical multiplexing technique is a method of dynamically changing transmission rates of respective programs to decrease transmission rate with respect to, e.g., the program in which degradation of the picture quality is not conspicuous even if the transmission rate is decreased to thereby carry out a larger number of programs.

An example of multiplexing by the fixed rate with respect to three programs, e.g., weather report, news and drama is shown in FIG. 1 for comparison. The abscissa indicates flow of the time, and the ordinate indicates allocation encoding rates with respect to respective programs. In this FIG. 1, respective programs remain to have encoding rate allocated at the initial value and do not change in dependency upon time. The initially allocated values in this case are values allocated (assigned) so that degradation at the portions (times) in which degradation of the picture quality is conspicuous at respective programs can fall within an allowed range. Namely, coding rates more than required are allocated to portions except for those portions.

On the contrary, an example in which four programs are multiplexed by using the technique of statistical multiplexing is shown in FIG. 2. In this case, coding rates of the weather report, news, drama 1 and drama 2 are caused to be dynamically changed. In this case, the point that the fact that portions (times) in which degradations of picture qualities of respective programs are conspicuous overlap with each other at the same time is rare is utilized. For this reason, since when a certain program is the portion in which degradation in the picture quality is conspicuous, degradation in the picture quality of other program is not conspicuous even if coding rate is lowered, coding rates of other program can be allocated to higher degree to the program in which degradation in the picture quality is conspicuous. In this way, programs which are greater than the ordinary case are permitted to undergo transmission.

Meanwhile, conventionally in storing one video program with respect to package media, e.g., Digital Video Disk (DVD) or video CD, an approach is employed in the encoding system for implementing compression-encoding processing to the video information to first measure encoding Difficulty (Difficulty) of picture image of material (data) to carry out, on the basis of its encoding difficulty, bit allocation (distribution) processing every frames of respective video information so as to fall within a given number of bytes within the recording capacity of the package media.

Namely, there was carried out 2 (two) pass encode processing to preliminarily compression-encode non-compressed video data to estimate compression-encoded data quantity thereafter to adjust compression factor on the basis of the estimated data quantity to carry out compression-encoding so that data quantity after undergone compression-encoding becomes equal to a value in conformity with the transmission capacity of the transmission path.

However, when compression-encoding is carried out by this 2 pass encode processing, there is a necessity of implementing, twice, similar compression encoding processing with respect to the same non-compressed video data. Since it is impossible to calculate final compressed video data by one compression-encoding processing, even if attempt is made to compression-encode plural video programs by the statistical multiplexing at the time of digital broadcasting so as to fall within a predetermined transmission rate to carry out transmission thereof, it takes too much time. Namely, it is impossible to compression-encode imaged video data on the real time basis as it is to carry out transmission thereof.

This invention has been made in view of the actual circumstances, and its object is to provide a video data encoding apparatus and a video data encoding method for carrying out, after undergone multiplexing, transmission of plural video programs substantially in real time so as to fall within a predetermined transmission rate.

Moreover, this invention has been made in view of the actual circumstances, and its object is to provide a video data transmission method for carrying out, after undergone multiplexing, transmission of plural video programs substantially in real time so as to fall within a predetermined transmission rate.

DISCLOSURE OF THE INVENTION

A video data encoding apparatus according to this invention aims at solving the above-mentioned problems to allow target encoding rate calculating means to calculate respectively independent target encoding rates on the basis of encoding difficulty related information of plural n number of video programs so that total transmission rate of the plural n number of video programs is a predetermined transmission rate or less, whereby the plural n number of encoding means encode the plural n number of video programs on the basis of the independent target encoding rate calculated at the target encoding rate calculating means.

In this case, the encoding difficulty related information that the video data encoding apparatus uses is parameter information which has been read in advance by the plural n number of encoding means provided with delay means therewithin. As delay means, there are used FIFOs for delaying the respective programs by time required for calculating the parameter information.

For this reason, encoded data in which total transmission rate when plural n number of programs that the plural n number of encoding means respectively output are multiplexed does not exceed the predetermined transmission rate even at any position when viewed from the time series can be obtained substantially in real time.

Moreover, flatness and intra AC data or either one of these data are/is calculated from picture image compressed into intraframe encoded picture among video data of the video programs as the parameter information to calculate ME residual as the parameter information of picture image compressed into interframe forward direction predictive encoded picture image and bidirectional predictive encoded picture image.

Further, the encoding difficulty related information that the video data encoding apparatus uses is code quantity obtained by implementing quantization processing at a fixed quantization step to the plural n number of video programs, and this code quantity may be obtained by plural n number of other encoding means connected in parallel with respect to the plural n number of encoding means.

In this case, at respective preceding stages of the plural n number of encoding means, there are provided plural n number of delay means for delaying the video programs by time required for allowing the plural n number of other encoding means to calculate the code quantity from the plural n number of video programs.

Moreover, in accordance with a video data encoding method according to this invention, an approach is employed to calculate the independent target encoding rate on the basis of encoding difficulty related information which has been read in advance of the plural n number of video programs so that total transmission rate of the plural n number of video programs is the predetermined transmission rate or less to encode the plural n number of video programs on the basis of the target encoding rate.

For this reason, encoded data in which total transmission rate when the plural n number of programs are multiplexed does not exceed the predetermined transmission rate even at any position when viewed from the time series can be obtained substantially in real time.

Moreover, a video data transmission method according to this invention aims at solving the problems to calculate, at a target encoding rate calculation step, the different target encoding rates on the basis of encoding difficulty related information which have been read in advance from plural n number of video programs so that total transmission rate of the plural n number of video programs is a predetermined transmission rate or less to encode, at an encoding step, the plural n number of video programs on the basis of the target encoding rate calculated at the target encoding rate calculating step, and to multiplex, at a multiplexing step, the encoded video programs from the encoding step.

For this reason, there is no possibility that total transmission rate of multiplexed outputs in which plural n number of programs that the plural n number of encoding means have encoded substantially in real time are multiplexed does not exceed the predetermined transmission rate even at any position when viewed from the time series.

BEST MODE FOR CARRYING OUT THE INVENTION

Explanation will now be given with reference to the attached drawings in connection with embodiments of a video data encoding apparatus and a video data encoding method, and a video data transmission method according to this invention.

This embodiment is video data transmission apparatus adapted for compression-encoding video data of plural video programs thereafter to multiplex such video data to carry out transmission thereof. In this case, this video data transmission apparatus is of a structure comprising multiplexing means at video data encoding apparatus to which the video data encoding method according to this invention is applied.

Figure 1:
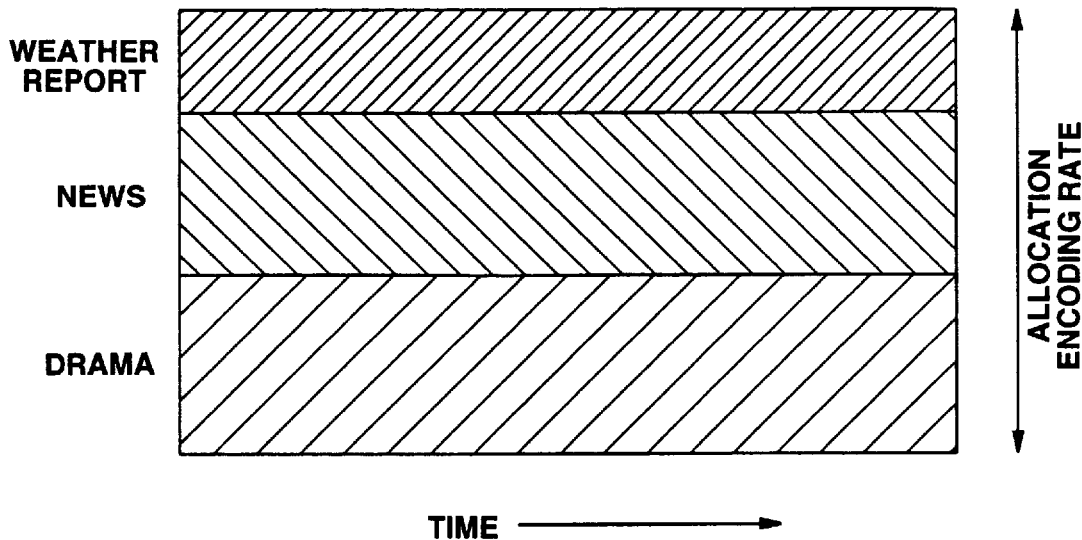
FIG. 1 is a view for explaining multiplexing by fixed rate.
Figure 2:
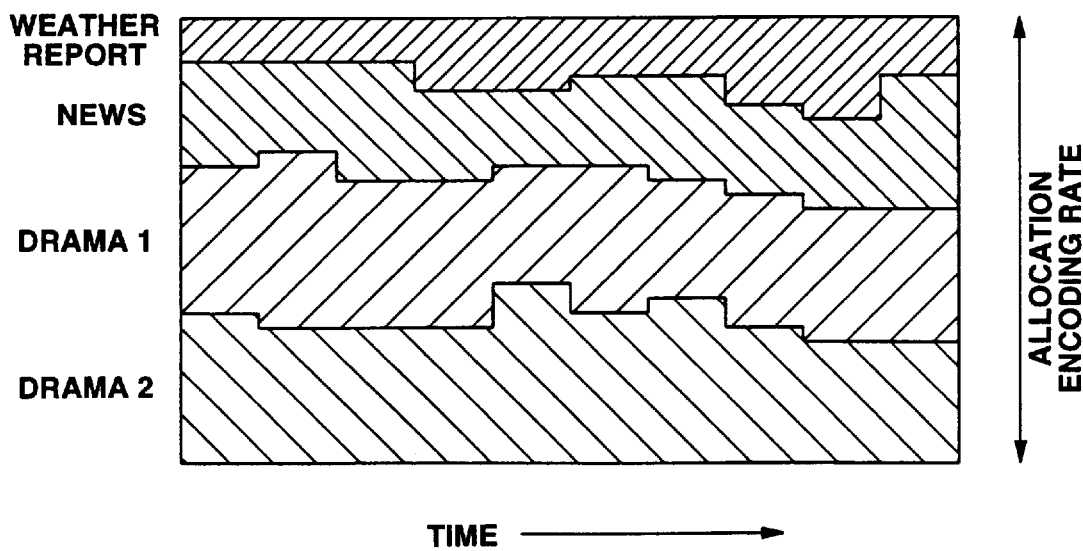
FIG. 2 is a view for explaining multiplexing by statistical multiplexing.
Figure 3:
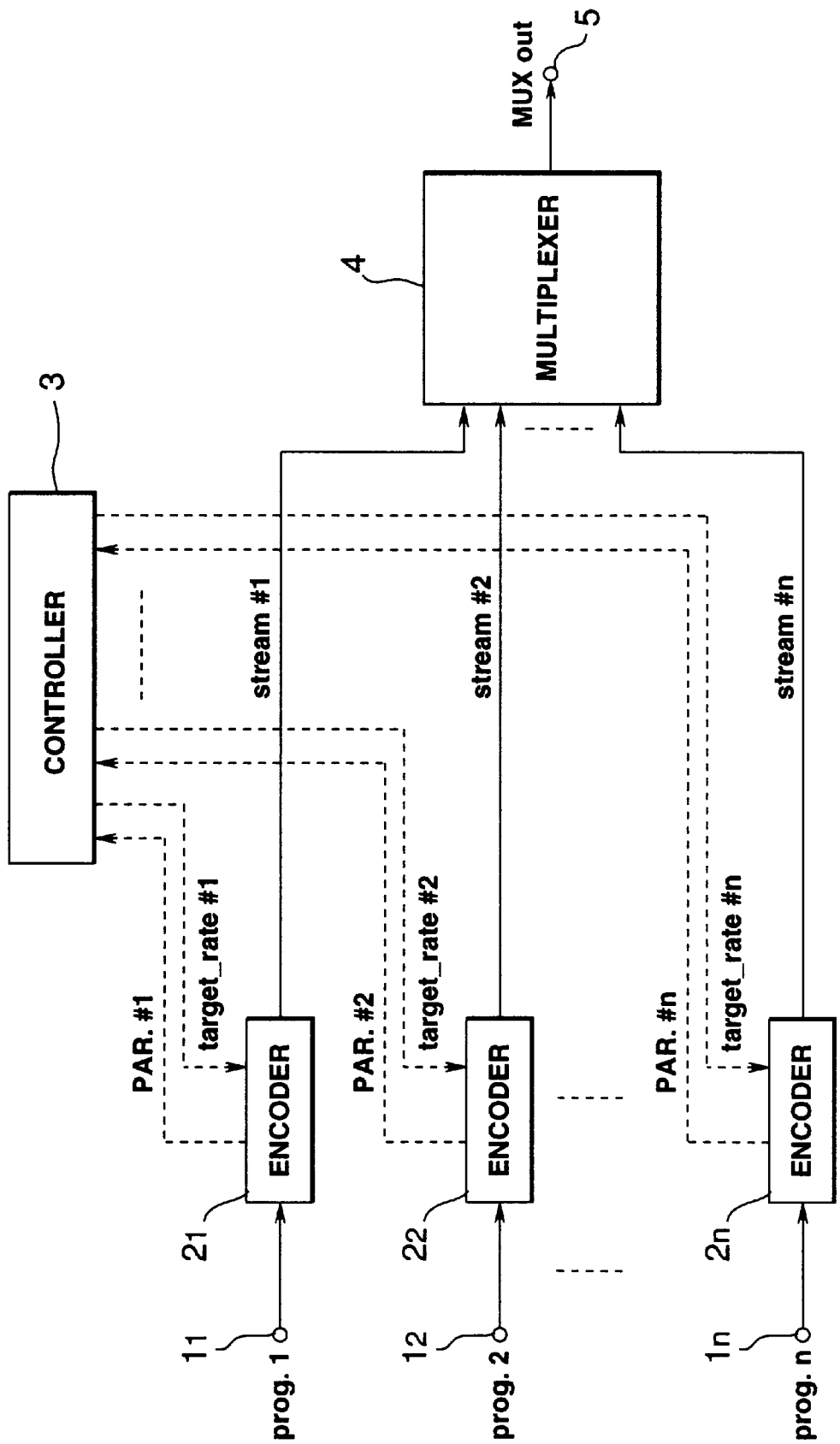
FIG. 3 is a block diagram of a video data transmission apparatus which is an embodiment of this invention.

This video data transmission apparatus includes, as shown in FIG. 3, plural, e.g., n number of encoders $2_1, 2_2 \ldots 2_n$ for carrying out read operation in advance of parameter information with respect to respective n number of programs prog. 1, 2 ... n delivered through $1_1, 1_2 \ldots$ and $1_n$ to allow a controller 3 which will be described later to estimate encoding difficulty related information "difficulty" when picture is encoded, and for compression-encoding the plural n number of programs on the basis of target encoding rate that the controller 3 has calculated on the basis of the parameter information, the above-described controller 3 for calculating allocation code quantities target_rate #1, #2 . . . #n every respective programs from parameter information PAR. #1, #2 . . . #n from the plural n number of encoders $2_1, 2_2 \ldots 2_n$ to deliver them to the encoders $2_1, 2_2 \ldots 2_n$, and a multiplexer 4 for multiplexing streams "stream" #1, #2 . . . #n that the encoders $2_1, 2_2 \ldots 2_n$ have encoded in accordance with the allocation code quantities target_rate #1, #2 . . . #n. Multiplexed output MUXout from this multiplexer 4 is delivered to an output terminal 5.

The encoders $2_1, 2_2 \ldots 2_n$ read in advance, as the above-mentioned parameter information from the respective programs prog. 1, 2 . . . n, flatness sum total of frame unit, intra AC sum total, DC value and ME residual to deliver them to the controller 3.

In this example, the encoders $2_1, 2_2 \ldots 2_n$ encode video data of the video programs in picture encoding group (GOP) units including a predetermined number of intraframe encoded pictures (I picture), interframe forward direction predictive encoded pictures (P picture), and bidirectional predictive encoded pictures (B picture) by the ordinary MPEG system. In this encoding, the above-mentioned parameter information is obtained.

Code quantity when encoded of picture can be estimated to some degree even if it is not actually encoded by fixed quantization, etc. As parameter information for estimation, flatness, intra AC, DC value and ME residual as described above are used in this invention.

Figure 4:
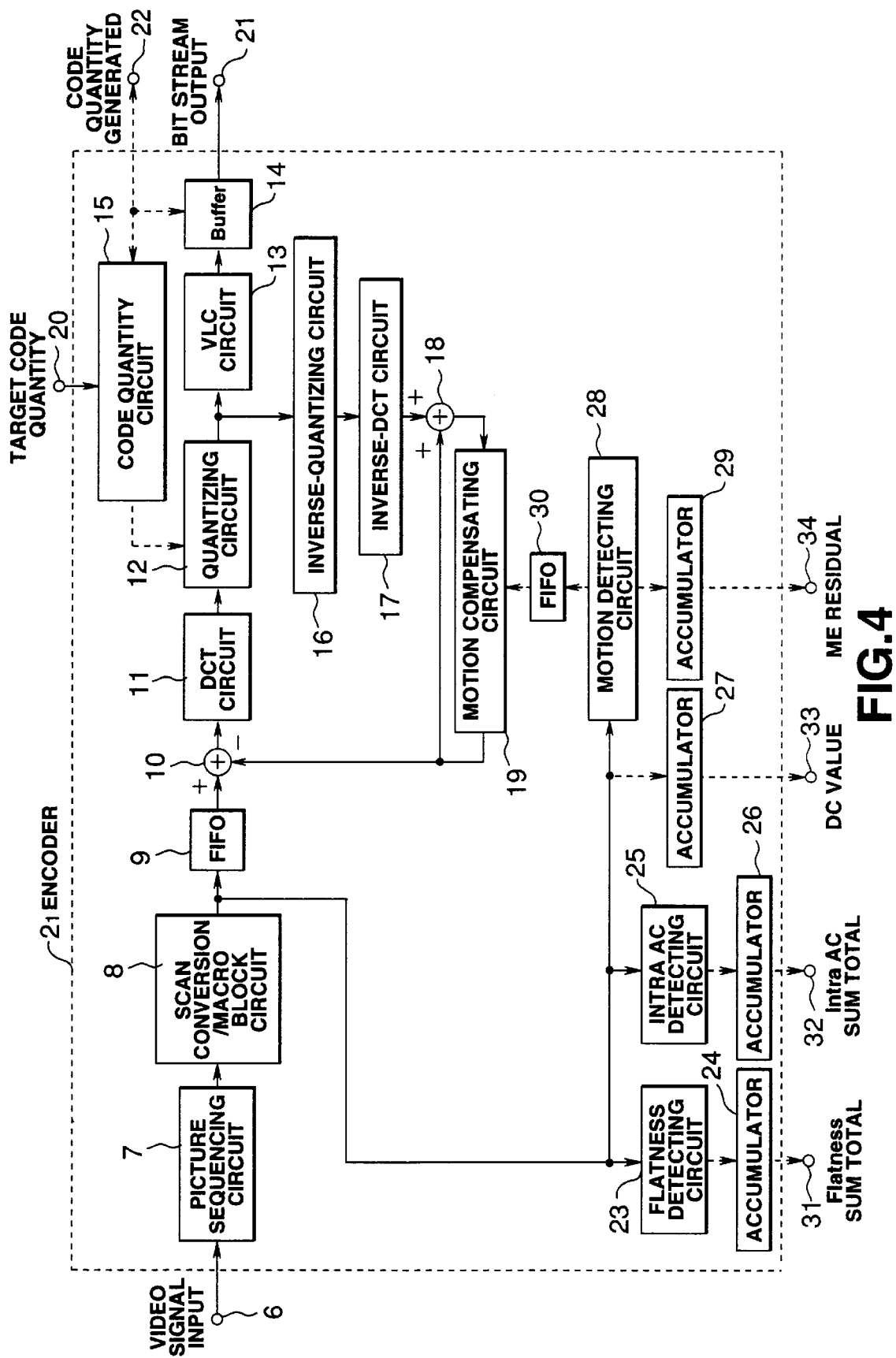
FIG. 4 is a block diagram showing the detailed configuration of an encoder used in the video data transmission apparatus shown in FIG. 3.

The configuration of the encoders $2_1, 2_2 \ldots 2_n$ will be described with referenced to FIG. 4. In this example, such encoder is represented by the encoder 21. As shown in FIG. 4, the encoder $2_1$ comprises a picture sequencing circuit 7, a scanning conversion/macro block conversion circuit 8, a FIFO 9, an adding circuit 10, a DCT circuit 11, a quantizing circuit 12, a variable length encoding circuit (VLC) 13, a buffer 14, a code quantity control circuit 15, an inverse-quantizing circuit 16, an inverse DCT circuit 17, an adding circuit 18, a motion compensating circuit 19, a FIFO 30 and a motion detecting circuit 28, and further comprises a flatness detecting circuit 23 for detecting the flatness, an accumulator 24 for calculating sum total every frame of flatness, an intra AC detecting circuit 25 for detecting intra AC, an accumulator 26 for calculating sum total every frame of intra AC, an accumulator 27 for calculating DC value every frame, and an accumulator 29 for calculating sum total every frame of ME residual from the motion detecting circuit 28.

A video signal input from an input terminal 6 is caused to undergo sequencing in order of encoding by the picture sequencing circuit 7. The video signal caused to be in order of encoding is caused to undergo field/frame conversion at the scanning conversion/macro block conversion circuit 8 so that macro blocks are provided. The video signal which has been caused to be changed into macro blocks is delivered to the flatness detecting circuit 23, the intra AC detecting circuit 25, the accumulator 27, and the motion detecting circuit 28 for the purpose of detecting the parameter information. Further, such video signal is also delivered to the FIFO 9.

Since it is necessary to read in advance the above-mentioned parameter information at this encoder $2_1$, it is necessary for data to be actually encoded to carry out time adjustment. In view of the above, picture data is delayed by the FIFO 9.

The delay at this FIFO 9 is time corresponding to about several GOPs mentioned above. Since length in point of time of GOP constituted by, e.g., 16 picture images is about 0.5 sec., the delay time is about 2~3 sec. at the best. Even in the case where there is program live-broadcast from the studio, if delay of substantially 2~3 sec. is ensured, such broadcast is the same as the broadcast of substantially real time.

Moreover, motion vector is delayed by the FIFO 30. In this case, since motion vector has information quantity less than picture data, it is sufficient that the FIFO 30 has a capacity smaller than the FIFO 9.

Figure 5:
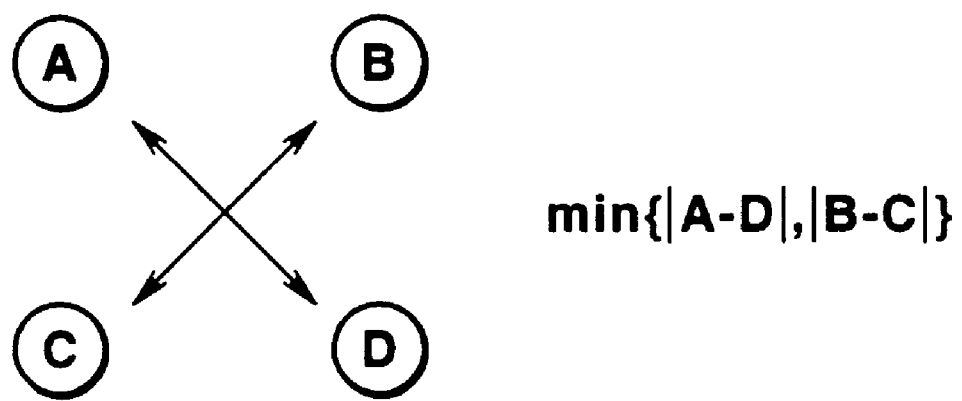
FIG. 5 is a view for explaining flatness that flatness detection circuit used in the encoder shown in FIG. 4 detects.

Flatness that the flatness detecting circuit 23 detects from video signal caused to be changed into macro blocks is parameter information representing spatial flatness of picture. As shown in FIG. 5, the flatness detecting circuit 23 divides picture image into small blocks of 2×2 to compare smaller one of difference value in which pixel values are cross-multiplied in that small block with threshold value. The flatness detecting circuit 23 calculates how many values smaller than the threshold value exist within the macro block to take sum totals thereof every frames. According as that picture is spatially complicated, the numeric value becomes smaller.

Figure 6:
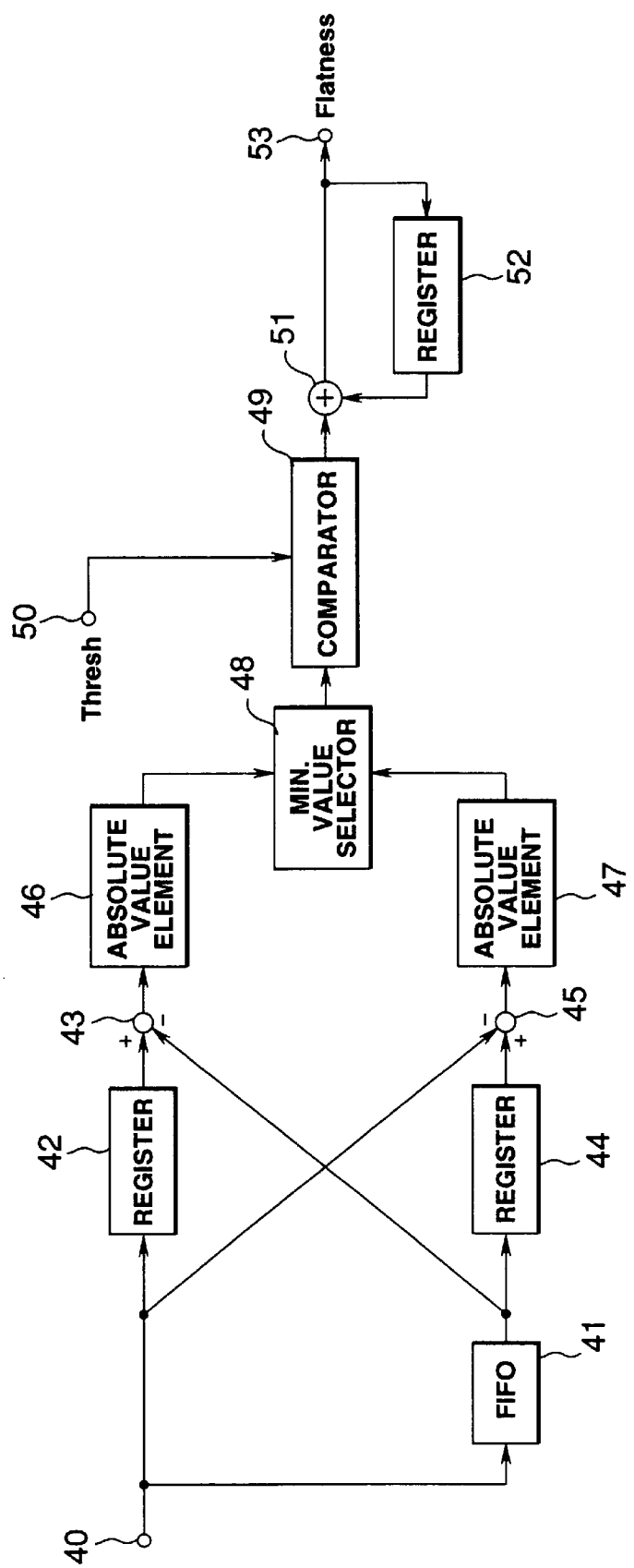
FIG. 6 is a block diagram showing the detailed configuration of the flatness detection circuit.

The detailed configuration of this flatness detecting circuit 23 is shown in FIG. 6. In this case, the video signals delivered to the flatness detecting circuit 23 are connected in macro block form. Namely, when the video signal is shifted by one macro block, data upper or lower by one line can be obtained. Luminance value of input video signal from an input terminal 40 is delivered to a FIFO 41 and a register 42. The FIFO 41 delays luminance value of the input video signal by one macro block line. The register 42 delays luminance value of the input video signal by one pixel.

A subtracter 43 takes difference between luminance value delayed by one pixel at the register 42 and luminance value delayed by one macro block line at the FIFO 41 to deliver it to an absolute value element (ABS) 46.

A register 44 delays, by one pixel, luminance value delayed by one macro block line at the FIFO 41. A subtracter 45 takes difference between output from the register 44, i.e., luminance value delayed by 1 line +1 pixel and the input video signal to deliver it to an absolute value element 47.

Absolute value output from the absolute value element 46 and absolute value output from the absolute value element 47 are inputted to a minimum value selector (MIN) 48. This minimum value selector 48 selects absolute value output of either smaller one to deliver it to a comparator (CMP) 49. This comparator 49 compares selected value and threshold value Thresh delivered from a terminal 50, whereby when the selected value is smaller than the threshold value, it outputs "1" to an accumulator constituted by an adder 51 and a register 52.

Since the operation is not suitable at the end of line in practice, it is necessary to correct data by the comparator 49, etc. If flatness values calculated every macro blocks are accumulated by time corresponding to the frame at the accumulator 24, flatness sum total is determined. This flatness sum total is delivered from the output terminal 31 of FIG. 4 to the controller 3. There is such a tendency that according as the flatness is decreased, code quantity is increased to more degree.

Intra AC that the intra AC detecting circuit 25 detects from the video signal caused to be changed into macro blocks is a value obtained, as indicated by the following formula (1), by determining average values of luminance signals every respective macro blocks to accumulate absolute values of differences between respective pixel values and these average values within the macro block.

$$\text{Intra\_AC} = \sum_{macroblock} \left| f_{curr}(x, y) \frac{\sum_{macroblock} f_{curr}}{N} \right| \quad (1)$$

Figure 7:
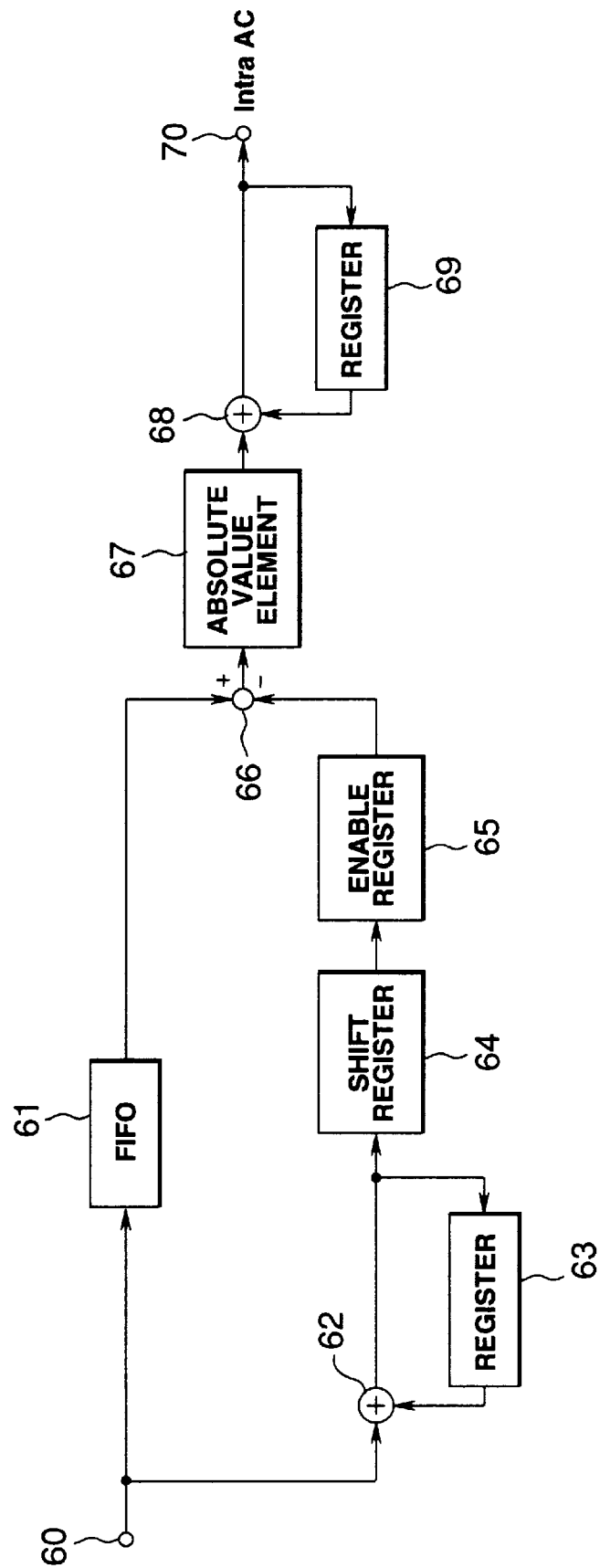
FIG. 7 is a block diagram showing the detailed configuration of intra AC detection circuit used in the encoder shown in FIG. 4.

The configuration of the intra AC detecting circuit 25 is shown in FIG. 7. Luminance value of input video signal delivered from an input terminal 60 is delivered to a FIFO 61, and an accumulator composed of an adder 62 and a register 63. The accumulated value from the accumulator is shifted at a shift register 64 so that division is carried out. Thus, average value of luminance values can be obtained. This average value is held by a register 65 with enable (terminal).

The FIFO 61 compensates delay for a time period during which the average value is determined. Luminance value of video signal through this FIFO 61 and average value held at the register 65 with enable are delivered to a subtracter 66. This subtracter 66 subtracts the average value from the delayed luminance value to deliver subtraction value to an absolute value element 67.

Difference absolute value that the absolute value element 67 has outputted is delivered to an accumulator composed of an adder 68 and a register 69, and is outputted through an output terminal 70.

When these intra ACs are accumulated by time corresponding to frame at the accumulator 26, intra AC sum total is determined. This intra AC sum total is delivered to the controller 3 from the output terminal 32 shown in FIG. 4. There is a tendency such that according as intra AC sum total increases, code quantity also increases to more degree.

DC value that the accumulator 27 calculates from the video signal caused to be changed into macro blocks to deliver it from output terminal 33 to the controller 3 is value obtained by totalizing, with respect to the picture, luminance signals every respective frames. DC value DC_sum is expressed as follows.

$$DC\_sum = \sum_{frame} \sum_{x=x_s}^{x_e} \sum_{y=y_s}^{y_e} f_{curr}(x, y) \quad (2)$$

For DC value, particularly complicated operation is not required. The configuration for determining DC value can be realized by simple accumulator 27. There is a tendency such that when DC value is decreased, degradation in picture quality becomes conspicuous from a viewpoint of visual sense.

Motion vectors from the motion detecting circuit 28 are accumulated at the accumulator 29, and ME residual delivered from output terminal 34 to the controller 3 is sum total of absolute values of differences between luminance signals of corresponding blocks with respect to motion vectors obtained every respective macro blocks and reference block. Namely, when corresponding block is assumed to be fcurr $(x, y)$ $\{x_s \leq x \leq x_e, y_s \leq y \leq y_e\}$ and motion vector is assumed to be $(mv_x, mv_y)$. ME residual ME_resid is expressed as follows $$ME\_resid = \sum_{x=x_s}^{x_e} \sum_{y=y_s}^{y_e} |f_{curr}(x, y) - f_{ref}(x + mv_x, y + mv_y)| \quad (3)$$

Since the ME residual is data obtained when ME is carried out at the motion detecting circuit 28, this ME residual can be obtained without newly requiring special hardware or operation in addition to the accumulator 29 corresponding to one frame. There is a tendency such that according as ME residual increases, code quantity also increases to more degree.

These parameter information PAR. 1 are delivered from the encoder $2_1$ to the controller 3 as described above. The controller 3 calculates allocation code quantity target_rate every respective programs from the parameter information PAR. 1 thus obtained to deliver them to the encoder $2_1$.

Figure 8:
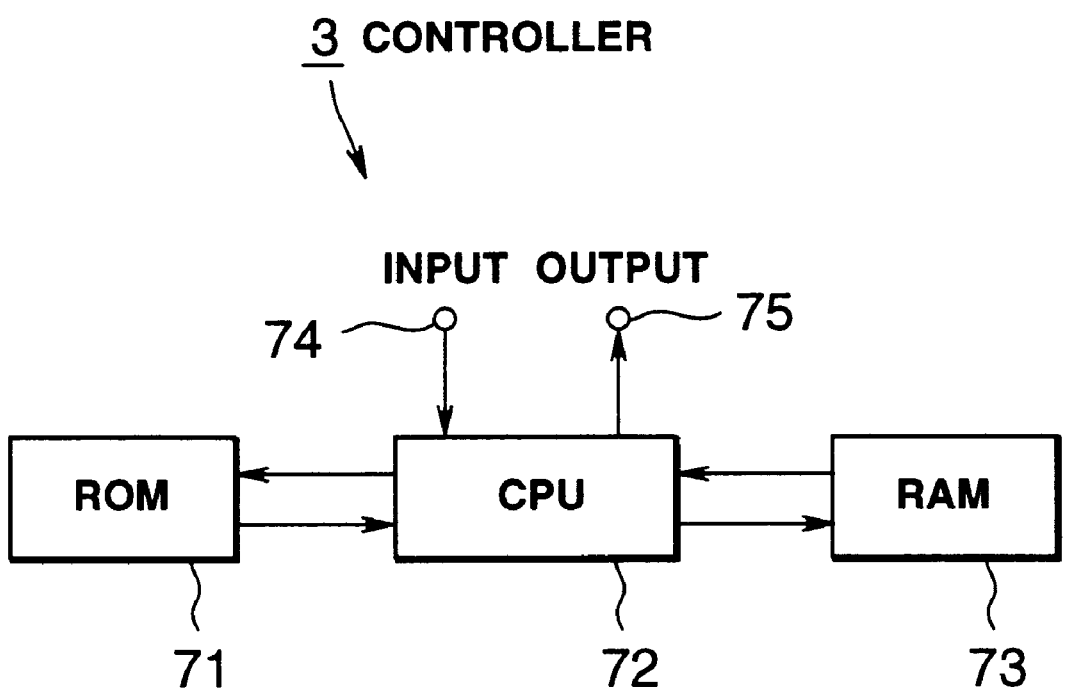
FIG. 8 is a block diagram showing the detailed configuration of controller used in the video data transmission apparatus shown in FIG. 3.

This controller 3 is composed of a ROM 71, a CPU 72, and a RAM 73 as shown in FIG. 8, for example. The CPU 72 is supplied with parameter information PAR. #1, #2 . . . #n from respective encoders $2_1, 2_2 \ldots 2_n$ as input through an input terminal 74, and target_rate #1, #2 . . . #n are sent to respective encoders $2_1, 2_2 \ldots 2_n$ as output through an output terminal 75 from the CPU 72. The CPU 72 executes algorithm and table stored in the ROM 71 while using the RAM 73 as work area.

Figure 9:
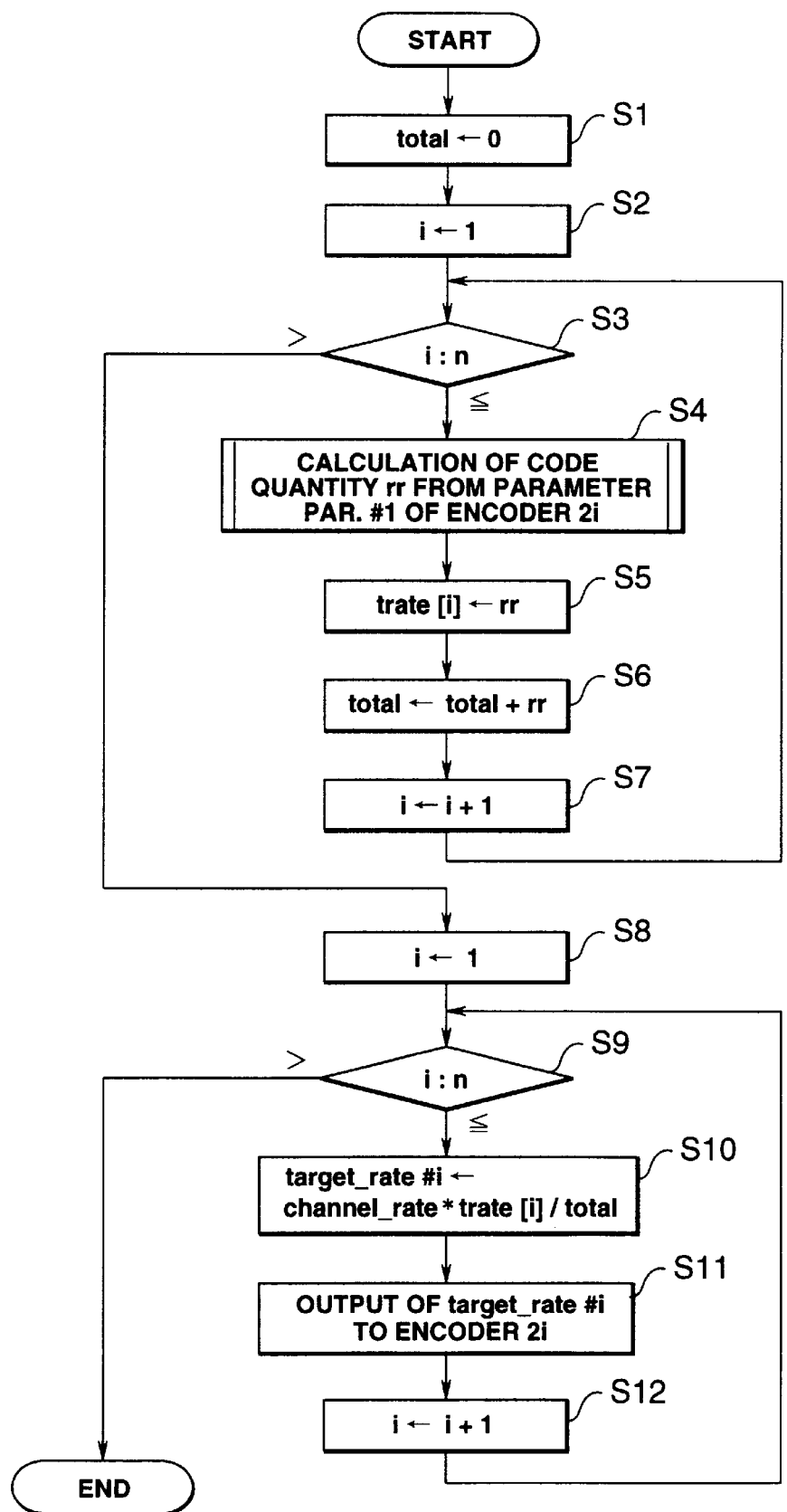
FIG. 9 is a flowchart for explaining algorithm carried out at the controller.

An example of algorithm stored in the ROM 71 is shown in FIG. 9. In this algorithm, target encoding rates target_rate are proportionally distributed by using code quantity rr obtained from parameter information PAR.#i after undergone estimation. It is now assumed that the rate of the entirety of the communication path is channel_rate and the number of programs is n.

Initially, at step S1, 0 is substituted as initial value into variable "total" into which sum total of estimation code quantities is included (stored). Then, at step S2, 1 is substituted as initial value for loop counter i. Then, if value of the loop counter i is greater than n at step S3, the processing operation is passed through the loop to proceed to step S8.

Then, at step S4, code quantity rr is estimated from parameter PAR.#i sent from the encoder $2_i$. Further, at step S5, rr is substituted into arrangement trate [i] into which estimation quantity is stored.

At step S6, rr is added to sum total "total" of estimation quantities. Then, at step S7, the loop counter i is incremented to return to the step S3 which is the leading portion of the loop.

Then, at step S8, 1 is substituted as initial value into the loop counter i. If the value of the loop counter i is greater than n at step S9, the processing operation is passed through the loop. Thus, the processing operation is completed.

At step S10, channel_rate are proportionally distributed at estimation quantity trate [i] as target code quantity target_rate #i of the i-th encoder. Namely, this quantity is assumed to be indicated by the following formula.

$$target\_rate\#i \leftarrow \frac{channel\_rate * trate[i]}{total} \quad (4)$$

At step S11, target_rate #i is delivered to the encoder. Further, the loop counter i is incremented at step S12 to return to the leading step S9 of this loop. As described above, in the video data transmission apparatus which is the embodiment of this invention, detection circuit for detecting parameter information serving as substitute of encoding difficulty related information is added to the conventional encoder to thereby encode plural video programs substantially in real time so as to fall within a predetermined transmission rate there after to multiplex them to carry out transmission of the multiplexed data.

Moreover, since it is sufficient to provide single encoder with respect to one program system, it is unnecessary to prepare two high cost encoders with respect to respective program systems. For this reason, in this embodiment, encoding by the statistical multiplexing can be realized at low cost.

It is to be noted that while four parameters of ME residual, DC value, intra AC and flatness are used as parameter information in the above-mentioned embodiment, it is unnecessary to use all of these parameters. In addition, any other information obtained from original picture may be employed.

Moreover, while parameter information is used for the purpose of estimating encoding difficulty, these parameters may be used as parameter at the time of encoding to obtain further satisfactory picture quality. In this case, FIFO for carrying out time adjustment between parameters is required.

Another embodiment of a video data encoding apparatus and a video data encoding method, and a video data transmission method according to this invention will now be described with reference to the attached drawings.

This another embodiment is also directed to a video data transmission apparatus adapted for compression-encoding video data of plural video programs thereafter to multiplex them to carry out transmission thereof. In this example, this video data transmission apparatus is of a structure comprising multiplexing means in the video data encoding apparatus to which the video data encoding method according to this invention is applied.

This another embodiment is directed to a video data transmission apparatus adapted for carrying out transmission of encoded output from an encoding apparatus after undergone multiplexing in which there is applied a video data encoding method of calculating difficulty of non-compressed video data from code quantity of compressed video data obtained by preliminarily compression-encoding non-compressed video data to adaptively control, on the basis of difficulty calculated from the preliminary compression-encoding, compression factor of non-compressed video data delayed by a predetermined time by, e.g., FIFO memory, etc.

Since non-compressed video data is permitted to adaptively undergo compression-encoding on the basis of difficulty of pattern of non-compressed video data substantially in real time also by this video data transmission apparatus, this apparatus can be applied to use purpose for which real time property such as on-the-spot telecast is required, and is suitable for transmission of plural programs using the technique of statistical multiplexing.

Figure 10:
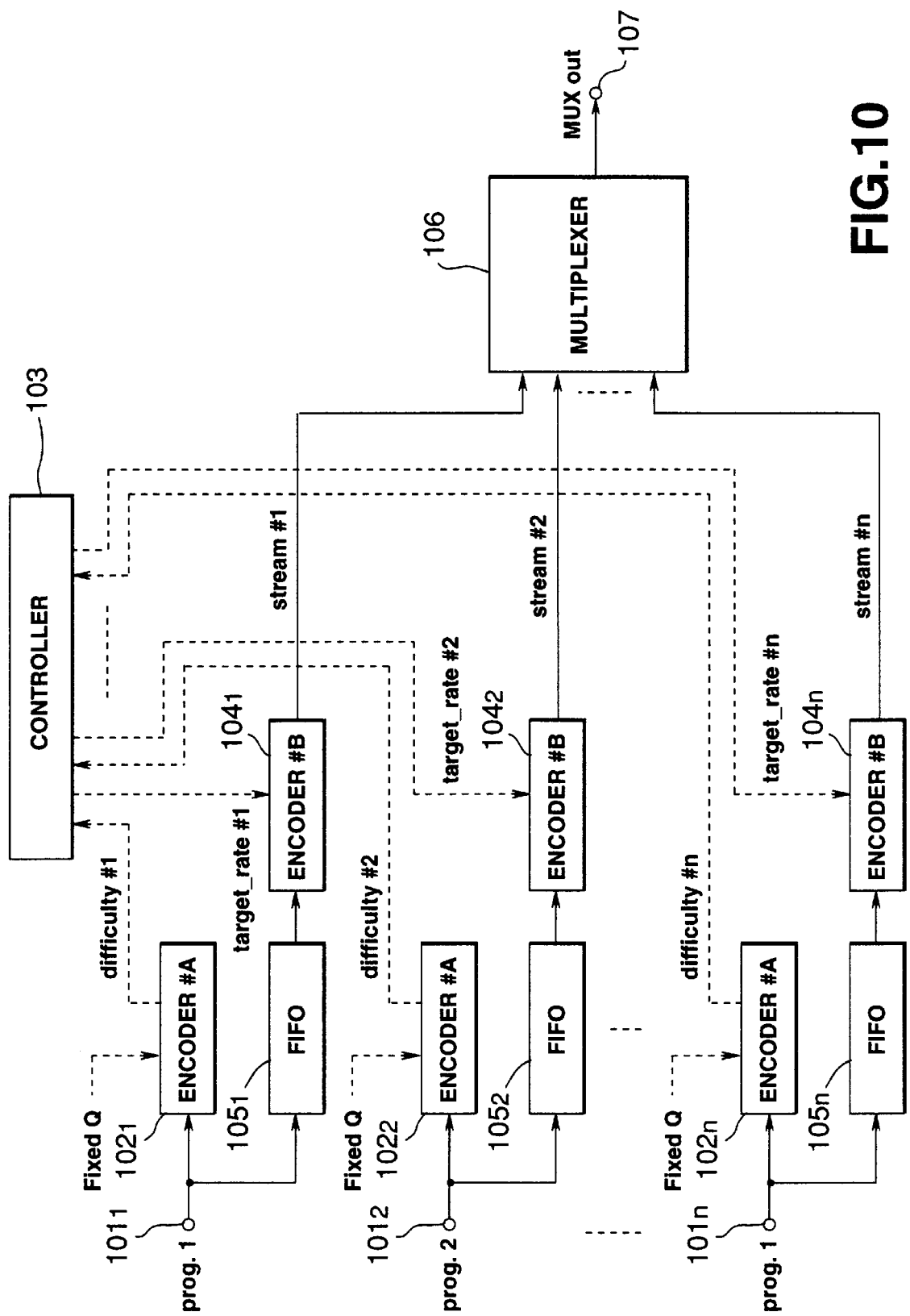
FIG. 10 is a block diagram showing the configuration of a video data transmission apparatus which is another embodiment of this invention.

As shown in FIG. 10, this video data transmission apparatus multiplexes n number of input programs prog. 1, 2 . . . n to carry out transmission thereof. Respective programs are delivered to encoders #A $102_1$, $102_2$ . . . and $102_n$ through input terminals $101_1$, $101_2$ . . . $101_n$. The respective encoders #A $102_1$, $102_2$ . . . and $102_n$ measure code quantities "difficulty" #1, #2 . . . #n when quantized at fixed quantization step Fixed Q. These measured code quantities "difficulty" #1, #2 . . . #n are sent to a controller 103. The controller 103 calculates allocation rates target_rate #1, #2, . . . #n of respective programs prog. 1, 2 . . . n on the basis of respective code quantities "difficulty" #1, #2 . . . #n to send them to respective encoders #B $104_1$, $104_2$ . . . $104_n$.

Data actually encoded by the encoders #B $104_1$, $104_2$ . . . $104_n$ are delayed by FIFOs $105_1$, $105_2$ . . . $105_n$ by time of read operation in advance.

Delays of these respective FIFOs are time corresponding to about several GOPs mentioned above. Since, e.g., length in point of time of GOP constituted by sixteen picture images is about 0.5 sec, the delay time is about 2~3 sec. at the best. Even when there is such a program live-broadcast from the studio, if there is delay of substantially about 2~3 sec., such broadcast is the same as the broadcast substantially on real time basis.

The encoders #B $104_1$, $104_2$ . . . $104_n$ encode input programs prog. 1, prog. 2, prog.n on the basis of given rates target_rate #1, #2 . . . #n. The encoded respective streams "stream" #1, #2 . . . #n are multiplexed by a multiplexer 106, and are delivered to an output terminal 107 as a multiplexed output MUXout.

Figure 11:
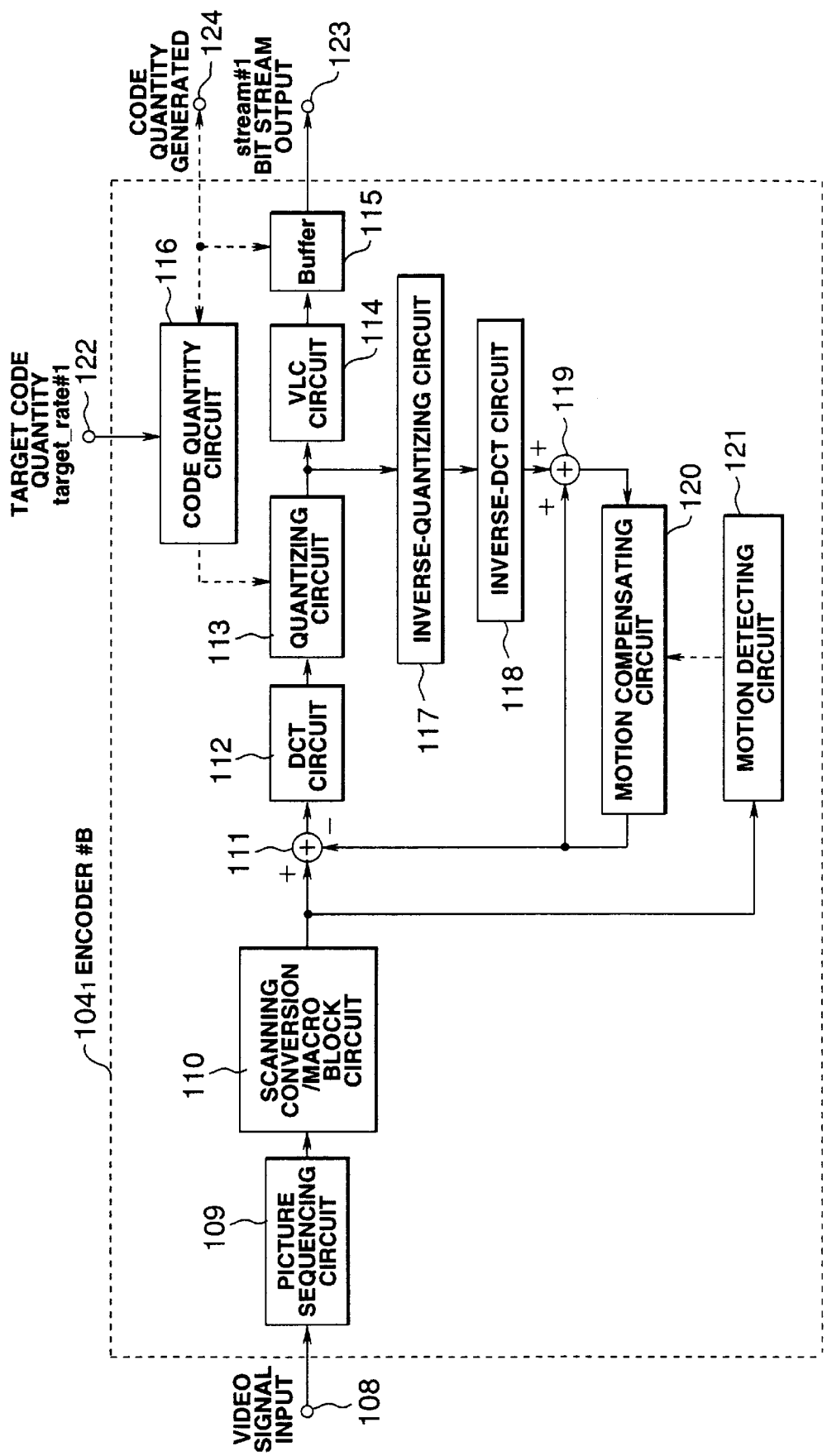
FIG. 11 is a block diagram showing the detailed configuration of encoder of the video data transmission apparatus shown in FIG. 10.

The detailed configuration of the encoders #A $102_1$, $102_2$ . . . and $102_n$ and the encoders #B $104_1$, $104_2$ . . . $104_n$ is shown in FIG. 11. In this example, such encoder is represented by encoder #B $104_1$. This circuit configuration is a typical video data compression-encoder composed of a picture sequencing circuit 109, a scanning conversion/macro block conversion circuit 110, an adding circuit 111, a DCT circuit 112, a quantizing circuit 113, a variable length encoding circuit (VLC) 114, a buffer 115, a code quantity control circuit 116, an inverse-quantizing circuit 117, an inverse DCT circuit 118, an adding circuit 119, a motion compensating circuit 120, and a motion detecting circuit 121.

The picture sequencing circuit 109 carries out sequencing of video signal inputs from an input terminal 108 in order of encoding. The scanning conversion/macro block conversion circuit 110 serves to carry out field/frame conversion to constitute macro blocks. In the case where, e.g., the video signal input is a video signal of cinema, 3:2 pull-down processing, etc. is carried out.

The adding circuit 111 subtracts output data of the adding circuit 119 from input video signal through the scanning conversion/macro block conversion circuit 110 to output it to the DCT circuit 112.

The DCT circuit 112 carries out Discrete Cosine Transform (DCT) processing of video data inputted from the adding circuit 111 in, e.g., macro block units of 16 pixels×16 pixels to carry out conversion from data of the time region to data of the frequency region to output it to the quantizing circuit 113.

The quantizing circuit 113 quantizes the data of the frequency region inputted from the DCT circuit 112 at fixed or arbitrary quantization step to output it as quantized data to the variable length encoding circuit 114 and the inverse-quantizing circuit 117.

The variable length encoding circuit 114 allows quantized data inputted from the quantizing circuit 113 to undergo variable length encoding to deliver compressed video data obtained as the result of the variable length encoding to the buffer 115. The buffer 115 carries out buffering of the compressed video data to deliver bit steam to an output terminal 123.

The inverse-quantizing circuit 117 inverse-quantizes the quantized data inputted from the quantizing circuit 113 to output it to the inverse-DCT circuit 118 as inverse-quantized data.

The inverse DCT circuit 118 implements inverse DCT processing to the inverse-quantized data inputted from the inverse-quantizing circuit 117 to output it to the adding circuit 119.

The adding circuit 119 adds output data of the motion compensating circuit 120 and output data of the inverse DCT circuit 118 to output it to the adding circuit 111 and the motion-compensating circuit 120.

The motion-compensating circuit 120 implements, to output data of the adding circuit 119, motion compensation processing on the basis of the motion vector that the motion detecting circuit 121 has calculated with respect to reference frame to output it to the adding circuit 111.

The encoders #A $102_1$, $102_2$ . . . and $102_n$ allow the quantizing circuit 113 to carry out quantization with quantization step determined at the code quantity control circuit 116 being as fixed value to measure code quantity generated of the buffer 115. This data is delivered as the encoding difficulty related information "difficulty" to the controller 103.

Moreover, at the encoders #B $104_1$, $104_2$ . . . $104_n$, target code quantity determined at the controller 103 is delivered to the code quantity control circuit 116. The code quantity control circuit 116 controls an arbitrary quantization step at the quantizing circuit 113.

The controller 103 calculates the target code quantity on the basis of the encoding difficulty related information "difficulty" from the encoders #A $102_1$, $102_2$ ... and $102_n$. Similarly to the case shown in FIG. 8, this controller 103 is composed of ROM 71, CPU 72, and RAM 73. The CPU 72 is supplied with the encoding difficulty related information "difficulty" #1, #2 ... and #n from the encoders #A $102_1$, $102_2$ ... and $102_n$ as input through input terminal 74, and target_rate #1, #2 ... #n are sent to the encoders #B $104_1$, $104_2$ ... and $104_n$ as output through output terminal 75 from the CPU 72. The CPU 72 executes algorithm and table stored in the ROM 71 while using the RAM 73 as work area.

Figure 12:
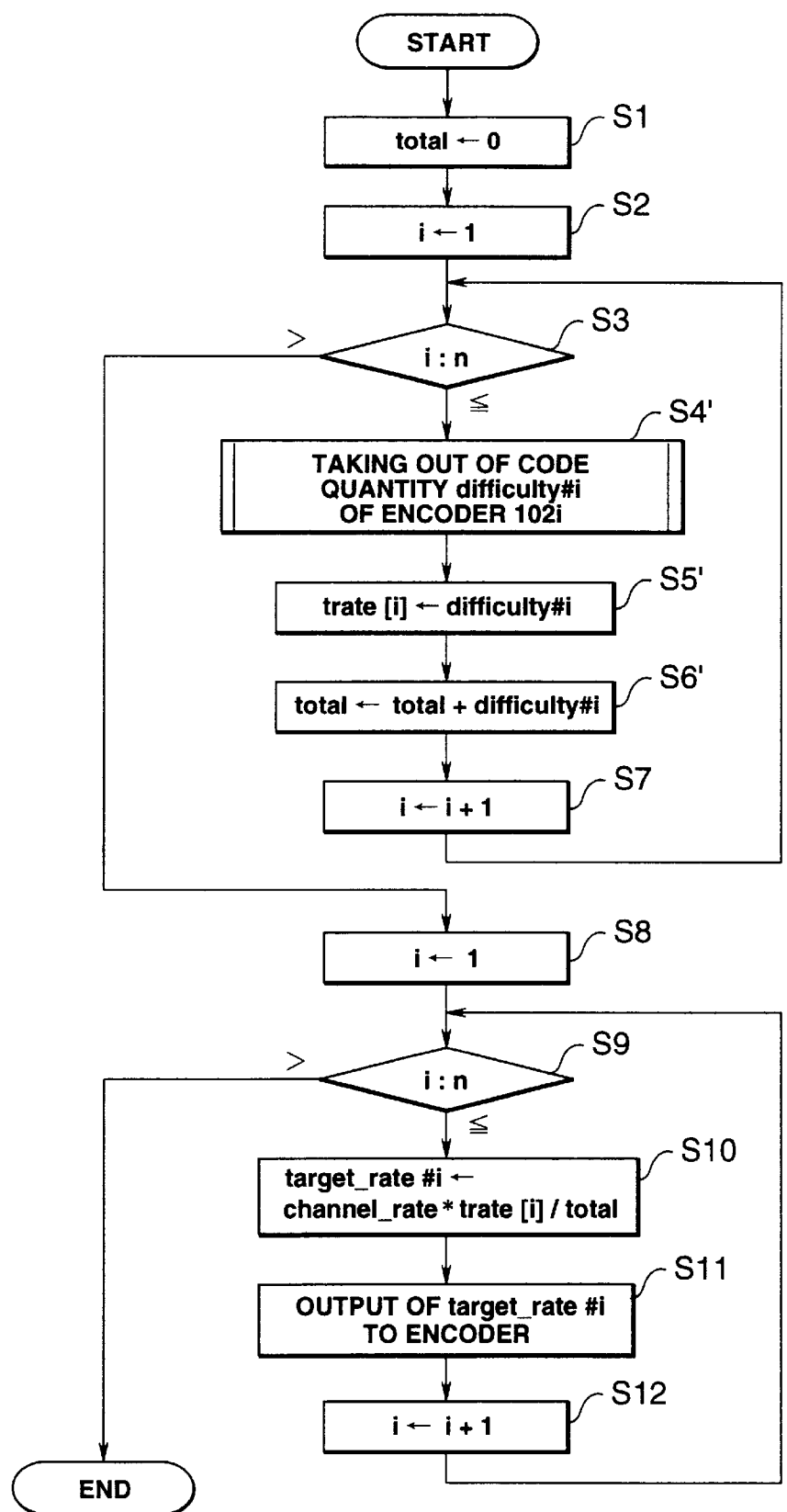
FIG. 12 is a flowchart for explaining algorithm that controller of the video data transmission apparatus shown in FIG. 10 carries out.

An example of algorithm stored in the ROM 71 is shown in FIG. 12. In this algorithm, encoding difficulty "difficulty." #i is used to proportionally distribute target encoding rates target_rate. The rate of the entirety of the communication path is caused to be channel_rate and the number of programs is caused to be n.

Initially, at step S1, 0 is substituted as initial value into variable total into which sum total of estimation code quantities is included (stored). Then, at step S2, 1 is substituted as initial value into the loop counter i. Further, if the value of the loop counter i is grater than n at step S3, the processing operation is passed through the loop to proceed to step S8.

Then, at step S4', encoding difficulty "difficulty." #i sent from the encoder $102_i$ is taken out to substitute difficulty. #i into arrangement trate [i] into which estimation quantity is stored at step S5'.

At step S6', difficulty. #i is added to sum total "total" of estimation quantities. Further, at step S7, loop counter i is incremented to return to the step S3 which is the leading portion of the loop.

At step S8, 1 is substituted as initial value into the loop counter i. If the value of the loop counter i is grater than n at step S9, the operation processing is passed through the loop. Thus, the operation processing is completed.

At step S10, as target code quantity target_rate #i of the i-th encoder, values of channel_rate are proportionally distributed at estimation quantity trate [i]. Namely, such estimation quantity is caused to be the same as the above-mentioned formula (4).

At step S11, target_rate #i is delivered to the encoder. Further, the loop counter i is incremented at step S12 to return to the leading portion (step) S9 of the loop.

As described above, in the video data transmission apparatus which is another embodiment of this invention, encoders #A $102_1$, $102_2$ ... and $102_n$ for measurement of encoding difficulty and FIFOs $105_1$, $105_2$ ... and $105_n$ are used, thereby making it possible to read data in advance. Thus, the statistical multiplexing by rate allocation of high accuracy can be made substantially in real time. In this case, in another embodiment, two encoders are required with respect to one program system.

It is to be noted that while, in this invention, FIFO is used to carry out reading operation in advance of data, encoding difficulty "difficulty" information may be determined in advance by encoder of fixed quantization to preserve it with respect to a suitable recording medium to make reference thereto when multiplexing.

If such an approach is employed, one encoder may be employed with respect to one program system similarly to the video data transmission apparatus shown in FIG. 3. Thus, it is unnecessary to require two high cost encoders. This does not constitutes problem from a viewpoint of cost.

Industrial Applicability

In accordance with the video data encoding apparatus and the video data encoding method according to this invention, plural video programs can be encoded in such a manner to have ability of carrying out transmission thereof after undergone multiplexing so as fall within a predetermined transmission rate.

In addition, in accordance with the video data transmission method according to this invention, plural video programs are permitted to undergo transmission after undergone multiplexing so as to fall within a predetermined transmission rate substantially in real time.

What is claimed is:

1. A video data encoding apparatus for determining independent target encoding rates for a plurality of video programs which are to be multiplexed into a predetermined transmission rate signal and encoding said plurality of video programs, the apparatus comprising:

target encoding rate calculating means for calculating the independent target encoding rates on the basis of encoding difficulty related information from each of said plurality of video programs so that the total transmission rate of the video programs when encoded and multiplexed together is not more than the predetermined transmission rate, the encoding difficulty related information being generated by a plurality of encoding means into which said plurality of video programs is input; and a plurality of encoding means for generating encoding difficulty related information from said plurality of video programs and for encoding said plurality of video programs on the basis of the target encoding rates calculated by the target encoding rate calculating means; said encoding means having FIFO circuits for delaying the input video programs until the target encoding rates are calculated; said encoding difficulty related information including at least flatness, average macroblock luminance, total frame luminance, and residual motion vector information.

2. A video data encoding apparatus as set forth in claim 1, wherein the plural n number of encoding means respectively encode video data of the video programs in picture encoding group units including a predetermined number of intraframe encoded pictures, interframe forward direction predictive encoded pictures and bidirectional predictive encoded pictures.

3. A video data encoding apparatus as set forth in claim 1, wherein the encoding difficulty related information is code quantity obtained by implementing quantization processing to the plural n number of video programs at a fixed quantization step, and this code quantity is obtained by other ones of the plural n number of encoding means connected in parallel with respect to the plural n number of encoding means.

4. A video data encoding apparatus as set forth in claim 3, wherein plural n number of delay means for delaying the video programs by time required for allowing other ones of the plural n number of encoding means to calculate the code quantity from the plural n number of video programs are provided at respective preceding stages of the plural n number of encoding means.

5. A video data encoding apparatus as set forth in claim 1, wherein the encoding difficulty related information is obtained by implementing quantization processing, at a fixed quantization step, with respect to the plural n number of video programs, and is recorded with respect to a recording medium.

6. A video data encoding method of determining independent target encoding rates for a plurality of video programs which are to be multiplexed into a predetermined transmission rate signal and encoding said plurality of video programs, the method comprising the steps of:

a pre-encoding step of generating encoding difficulty related information from each of said plurality of video programs and for delaying the input video programs using FIFO circuits until the independent target encoding rates are calculated; said encoding difficulty related information including at least flatness, average macroblock luminance, total frame luminance, and residual motion vector information;

a target encoding rate calculation step of calculating the independent target encoding rates on the basis of said encoding difficulty related information from said pre-encoding step so that the total transmission rate of the video programs when encoded and multiplexed together is not more than the predetermined transmission rate; and an encoding step of encoding said plurality of video programs on the basis of the independent target encoding rates calculated at the target encoding rate calculation step.

7. A video data encoding method as set forth in claim 6, wherein, at the encoding step, a procedure is taken to encode video data of the video programs in picture encoding group units including a predetermined number of intraframe encoded pictures, interframe forward direction predictive encoded pictures and bidirectional predictive encoded pictures.

8. A video data encoding method as set forth in claim 6, wherein the encoding difficulty related information is code quantity obtained by implementing quantization processing, at a fixed quantization step, to the plural n number of video programs, and this code quantity is obtained by other encoding steps carried out in parallel with respect to the encoding step.

9. A video data encoding method as set forth in claim 8, wherein, at the encoding step, a procedure is taken to implement the encoding processing to the video program delayed by time required for calculating the code quantity from the plural n number of video programs at the other encoding steps.

10. A video data transmission method of determining independent target encoding rates for a plurality of video programs which are to be multiplexed into a predetermined transmission rate signal and encoding said plurality of video programs, the method comprising the steps of:

a pre-encoding step of generating encoding difficulty related information from each of said plurality of video programs and for delaying the input video programs using FIFO circuits until the independent target encoding rates are calculated; said encoding difficulty related information including at least flatness, average macroblock luminance, total frame luminance, and residual motion vector information;

a target encoding rate calculation step of calculating the independent target encoding rates on the basis of said encoding difficulty related information from said pre-encoding step so that the total transmission rate of the video programs when encoded and multiplexed together is not more than the predetermined transmission rate;

an encoding step of encoding said plurality of video programs on the basis of the independent target encoding rates calculated at the target encoding rate calculation step; and a multiplexing step of multiplexing the encoded video programs from the encoding step.

11. A video data transmission method as set forth in claim 10, wherein, at the encoding step, a procedure is taken to encode video data of the video programs in picture encoding group units including a predetermined number of intraframe encoded pictures, interframe forward direction predictive encoded pictures and/or bidirectional predictive encoded pictures.

12. A video data transmission method as set forth in claim 10, wherein the encoding difficulty related information is code quantity obtained by implementing quantization processing, at a fixed quantization step, to the plural n number of video programs, and this code quantity is obtained from other encoding steps carried out in parallel with respect to the encoding step.

13. A video data transmission method as set forth in claim 12, wherein delay steps for delaying the video programs by time required for calculating the code quantity from the plural n number of video programs at the other encoding step are provided at respective preceding steps of the encoding step.

14. A video data transmission method as set forth in claim 10, wherein the encoding difficulty related information is code quantity obtained by implementing quantization processing, at a fixed quantization step, to the plural n number of video programs, and this code quantity is recorded with respect to a recording medium and is caused to undergo referencing at the time of multiplexing.

15. A video data encoding apparatus for determining independent target encoding rates for a plurality of video programs which are to be multiplexed into a predetermined transmission rate signal and encoding said plurality of video programs; said apparatus comprising:

a plurality of first encoders for generating encoding difficulty related information from each of said plurality of video programs said encoding difficulty related information including at least flatness, average macroblock luminance, total frame luminance, and residual motion vector information;

a controller for calculating the independent target encoding rates for each of said plurality of video programs on the basis of the encoding difficulty related information generated by said plurality of first encoders; the independent target encoding rates being calculated such that the total transmission rate of the video programs when encoded and multiplexed together is not more than the predetermined transmission rate;

a plurality of FIFO circuits for delaying the input video programs until the independent target encoding rates are calculated by said controller; and a plurality of second encoders for encoding said plurality of video programs delayed by said plurality of FIFO circuits on the basis of the independent target encoding rates calculated by said controller.

16. A video data encoding apparatus as set forth in claim 15, wherein said plurality of second encoders encodes the plurality of video programs in picture encoding group units including a predetermined number of intraframe encoded pictures, interframe forward direction predictive encoded pictures and bidirectional predictive encoded pictures.

17. A video data encoding apparatus as set forth in claim 15, wherein said encoding difficulty related information generated by said plurality of first encoders is code quantity obtained by quantizing each program of said plurality of video programs using a fixed quantization step size.

18. A video data encoding apparatus as set forth in claim 17, wherein said encoding difficulty related information is recorded on a recording medium.

* * * * *